Oct. 11, 1960 — A. C. HARTLEY — 2,955,626
PIPE LINES FOR LOADING AND UNLOADING SHIPS AND OTHER VESSELS
Filed Aug. 5, 1957 — 3 Sheets-Sheet 1

INVENTOR
A. C. Hartley
By John A. Seifert
ATTORNEY

Oct. 11, 1960 A. C. HARTLEY 2,955,626
PIPE LINES FOR LOADING AND UNLOADING SHIPS AND OTHER VESSELS
Filed Aug. 5, 1957 3 Sheets-Sheet 3
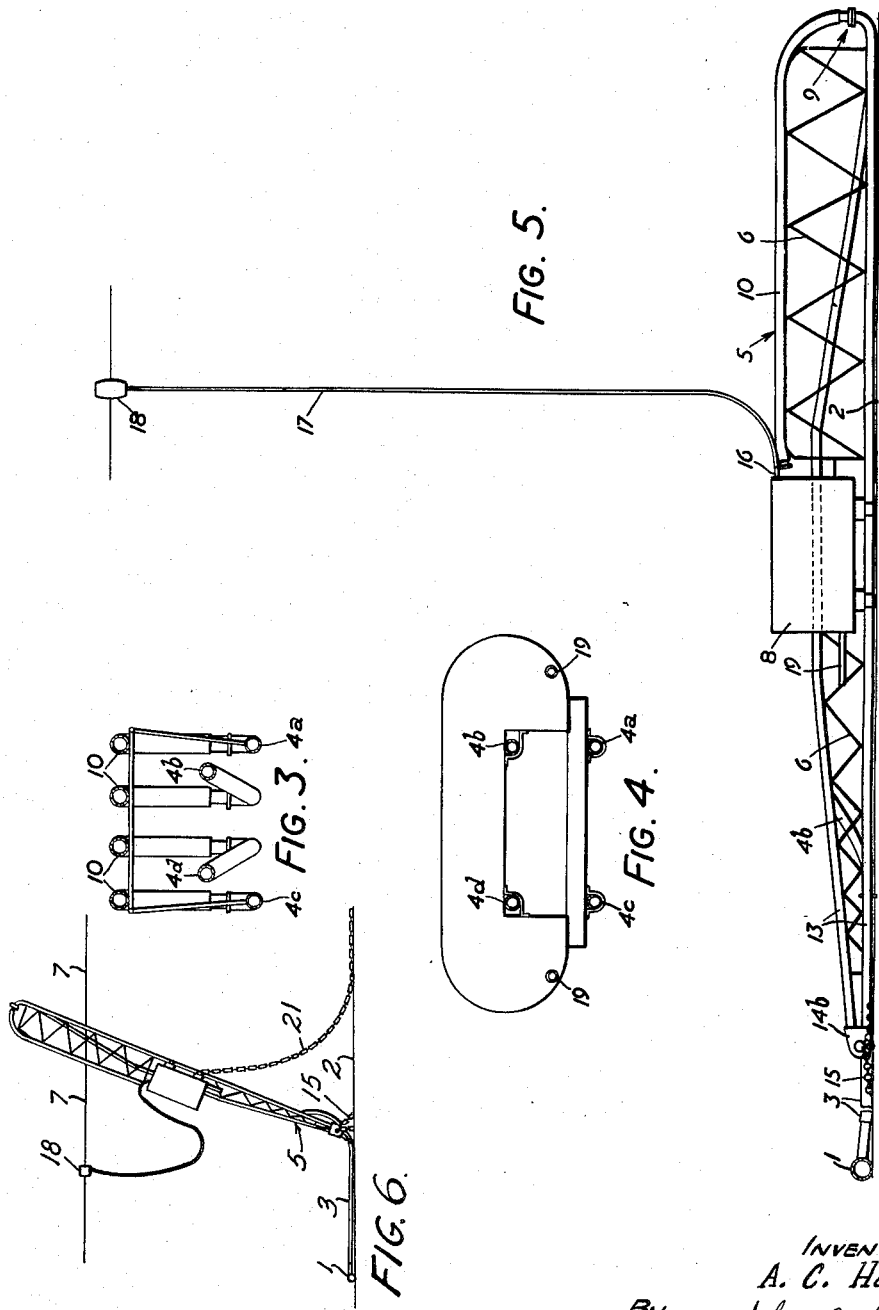
INVENTOR
A. C. Hartley
By
ATTORNEY.

United States Patent Office 2,955,626
Patented Oct. 11, 1960

2,955,626

PIPE LINES FOR LOADING AND UNLOADING SHIPS AND OTHER VESSELS

Arthur Clifford Hartley, West Byfleet, England, assignor to Clifford Hartley Patents Limited, West Byfleet, England, a British company Filed Aug. 5, 1957, Ser. No. 676,113

Claims priority, application Great Britain Aug. 8, 1956

20 Claims. (Cl. 141—279)

The present invention relates to improvements in pipe lines for loading and unloading ships and other vessels and has for its object to provide an improved means for effecting a connection between a ship or other vessel and a pipe line laid on the bed of the sea or other body of water.

A known arrangement for effecting the loading and unloading of tanker ships at places where there is no dock or jetty alongside which the tanker can be moored comprises a pipe line laid out along the sea bottom into sufficiently deep water. The seaward end of this pipe line is connected to one, or at the most two, flexible hoses, which normally lie on the bottom. When a tanker has been anchored or moored in position, she picks up buoyed cables attached to the hose or hoses and hauls the latter to the surface for coupling to her own pipe system.

With such an arrangement, the long lengths of heavy hose required have to be lifted by the ship's own gear and the diameter of the hose which can be employed is limited, thus restricting the rate of loading or unloading. Moreover, wear and tear on the flexible hoses employed is very heavy. Attempts to use more than two such hoses have failed because the hoses become tangled.

According to the present invention there is provided an elongated rigid structure secured at one end to the bed of the sea or other body of water in such a manner that said structure is capable of pivotal movement about said one end, one or more buoyancy chambers on said structure which when filled with air maintain the structure in a vertical or near vertical position with the other end of said structure above the surface, and means for effecting a fluid connection between a ship or other vessel and a pipe line laid on the bed.

A form of structure according to the invention suitable for loading and unloading tanker ships will now be described in detail by way of example only, reference being made to the accompanying drawings, in which:

Figure 3 is a section on the line III—III of Figure 2;

Figure 4 is a section on the line IV—IV of Figure 2;

Figure 5 is a diagrammatic side view of the structure when lying on the bed of a river, lake or the sea etc.; and Figure 6 is a diagrammatic side view, on a reduced scale, of the structure in position of stable equilibrium.

Figure 1:
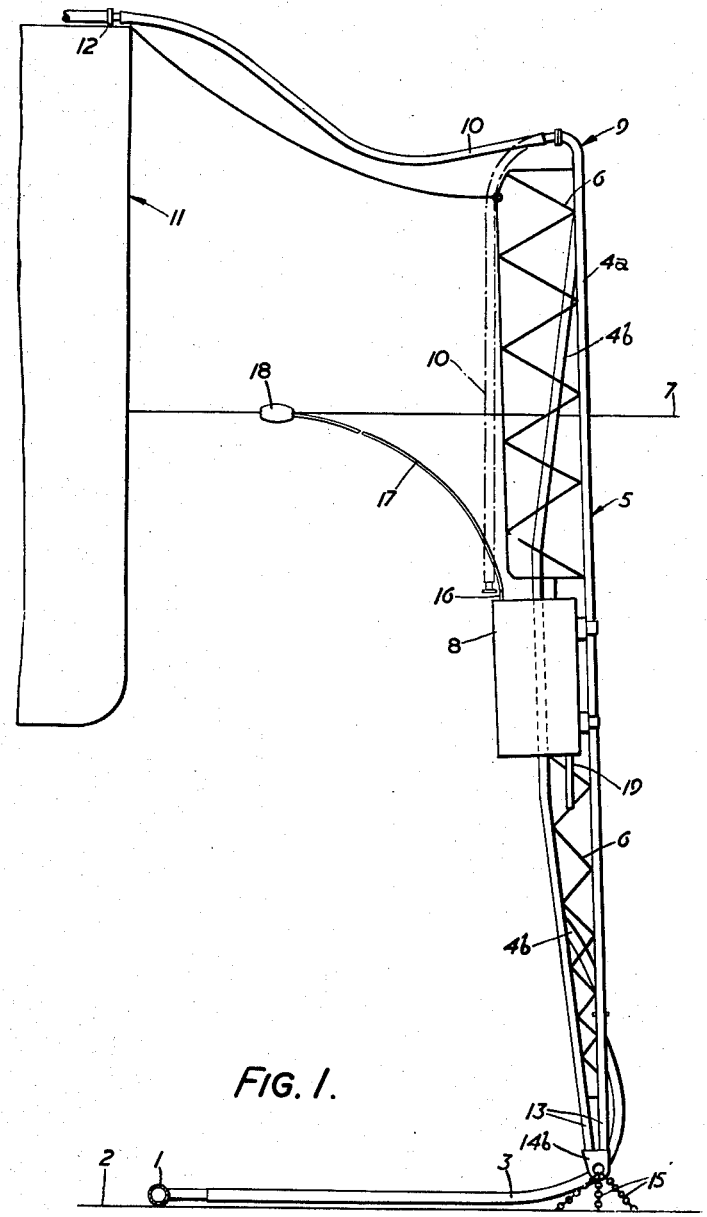
Figure 1 is a diagrammatic side view of the structure in the normal loading and unloading position.

Referring to the drawings, a pipe line 1 laid on the bed 2 of a river, lake or the sea etc. is connected by lengths 3 of flexible hose, or flexibly jointed pipe to four rigid pipes 4a, 4b, 4c and 4d which form the main support members of a structure 5, additional support being provided by a framework 6. The structure is of sufficient length to extend well above the surface 7, when raised by a buoyancy tank 8 secured to the structure into a vertical or near vertical position (Figures 1 and 2), but normally lies horizontally on the bed 2 as shown in Figure 5. The size of the tank 8 is such that the structure can be given an amount of positive buoyancy considerably in excess of its weight.

Although not essential, it has been found highly desirable to position the tank 8 on the structure 5 so that the buoyancy of the tank tends to raise the structure to an elevated position in which the structure is inclined to the vertical. To this end, the tank or buoyancy chamber is disposed with its center of buoyancy to one side of the longitudinal center line of the structure, or more exactly to one side of the plane passing through the two points 14a, 14b at which the structure is moored to the sea bed and extending longitudinally of the structure. The size of the buoyancy chamber or tank may be such that the structure will be raised to said inclined elevated position when said tank has less than its maximum positive buoyancy, and further increase in the buoyancy will not bring the structure any nearer to the vertical. Thus, this elevated position constitutes a position of stable equilibrium, to which the structure will always try to return if displaced therefrom. In the arrangement shown in the drawings, the structure assumes, when not connected to the ship, a stable elevated position in which it lies at an angle of 70° to its horizontal position (Figure 5) on the bed. Buoyancy of the tank in excess of that required to bring the structure to its position of stable equilibrium improves the steadiness of the structure when loading and unloading a ship or other vessel in rough weather. The inclination of the structure when it is in its position of stable equilibrium is arranged to be in a direction away from the ship or other vessel, the structure being held pulled towards the ship while loading or unloading takes place, so that the structure tends to swing away from the ship and the chance of the ship and the structure making contact is materially reduced. The stable elevated position is shown in Figure 6.

Figure 2:
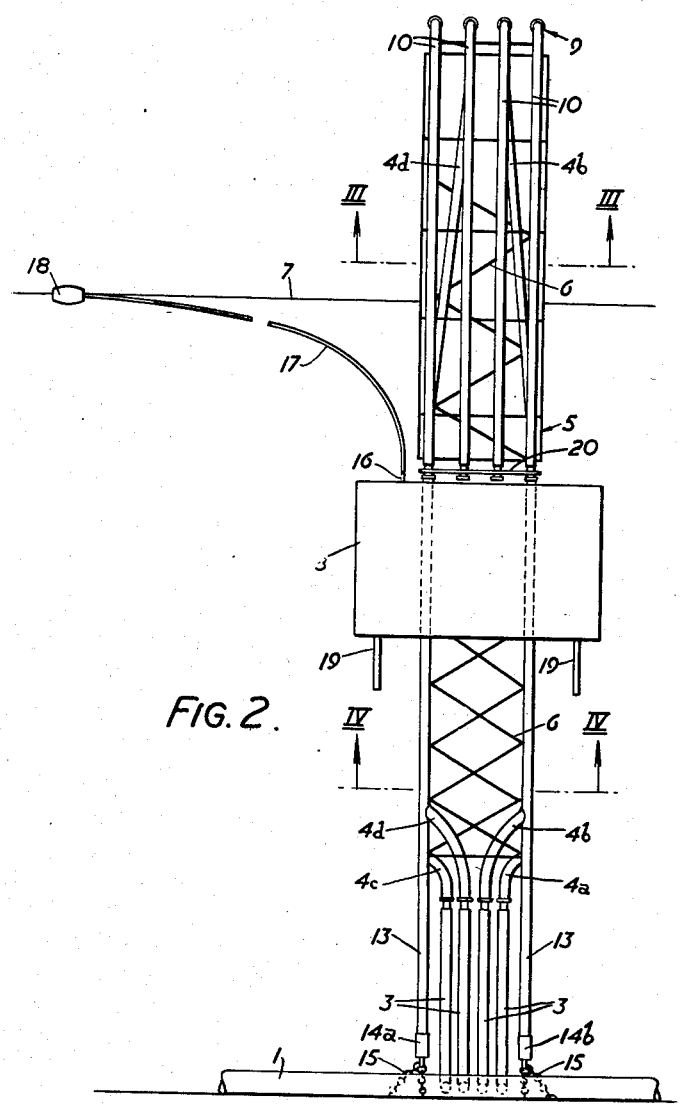
Figure 2 is a diagrammatic front view of the structure in the normal loading and unloading position, but not connected to a tanker ship.

To the upper end 9 of each of the pipes 4a, 4b, 4c and 4d is connected a flexible delivery hose 10 for connection to a tanker ship indicated at 11 (Figure 1). Each of the hoses 10 is provided at its free end with sealing and coupling means 12 whereby the hoses 10 may be connected to the ship's tanks, or when not so connected, sealed off. The lower end of each of the pipes 4a–d consists of a sealed off extension 13. The extension 13 of pipes 4a and 4b and pipes 4c and 4d are welded to shackle blocks 14b and 14a respectively. The whole structure 5 is anchored to the bed 2 by means of three inclined chains 15 attached to each shackle block. The arrangement of each of the sets of three chains 15 is such as to allow some freedom of movement to each of the shackle blocks 14a and 14b, as well as permitting the structure 5 to swing in a vertical plane about an axis passing through the two shackle blocks. The arrangement of the chains 15 must also permit of considerable movement of the upper end of the structure in any direction within an area which is nearly square in plan with sides nearly equal to the length of the structure. The disposition of the dead weight of the structure 5 is preferably such that the chains 15 are kept taut before and during the raising of the structure.

To an inlet 16 provided on the top end (Figures 1 and 2) of the buoyancy tank 8 is secured one end of a flexible air hose 17, the other end of the air hose being maintained on the surface 7 by a buoy 18. The buoyed end of the air hose 17 is provided with an air valve (not shown). The bottom end (Figures 1 and 2) of the buoyancy tank 8 is provided with vents 19 through which the water is expelled. It may be desirable to provide lines 22 between the ship and the structure to control it and to take any strain which might be imposed on the flexible hoses 10 in the absence of such lines.

When it is required to load, say, an oil tanker, the tanker is moored fore and aft to mooring buoys (not shown) positioned alongside the submerged structure 5 (Figure 5). The buoyed air hose 17 is picked up by an attendant launch and connected to an air compressor or supply of compressed air. The compressed air forces the water out of the buoyancy tank 8 through the vents 19 causing the structure 5 to rise from its normal submerged or horizontal position on the bed 2 (Figure 5) to said position of maximum possible elevation. This brings the upper end 9 of the structure well above the surface at a convenient position for securing the delivery hoses 10 to pipes on the ship connected to the ship's oil tanks. Any suitable means, such as a buoyed hoisting cable (not shown) attached to a yoke 20 (Figure 2) holding the free ends of the hoses 10 together, may be provided to facilitate hoisting of the hoses 10 from their dotted line position to their solid line position (Figure 1). The free ends of the delivery hoses are coupled to the oil pipes on the ship and then a signal to start loading the ship with oil is sent to a shore based pumping station. When the required amount of oil has been loaded onto the tanker pumping is ceased, the hoses 10 uncoupled and sealed and the air valve on the end of the air hose 17 released. This allows water to re-enter the tank 8 at a controlled rate causing the structure 5 to sink slowly to its normal position on the bed where it rests until it is required again.

While a preferred form of structure according to the invention has been described in detail by way of example only, it should be understood that variations and modifications may be made thereto without departing from the scope of the invention.

Whereas one buoyancy tank 8 is shown it may be convenient to have two or more separate buoyancy tanks or one tank divided into two or more separate buoyancy chambers. Various shapes may be employed for the tank or tanks. When two or more such tanks or chambers are employed it is possible to have some of them permanently emptied of water but providing insufficient buoyancy to raise the structure off the bed. This arrangement speeds the rate at which the structure can be raised since a smaller volume of water has to be expelled before buoyancy is reached. Further, the permanently emptied tanks or chambers may contain air at sufficient pressure to blow the remaining tanks or chambers free of water. This is brought about in order to raise the structure by providing a duplicate air line with 17 so that the transfer of air from the compressed air tank or chamber to the other tank or chambers can be controlled by the buoyed air valve. The compressed air tank or chamber can be recharged when the structure is in any position.

In the drawings the tank 8 is shown as surrounding substantially three sides of the structure 5 (Figure 4). Alternatively, two or four of the pipes 4a, b, c and d may be arranged to pass through the tank. The height at which the tank or buoyancy chambers is situated on the structure must be such that the tank or buoyancy chambers will be covered by about five to seven feet of water at low water to avoid the disturbances due to wave action. Otherwise, the buoyancy tank should be positioned as far from the base of the structure as possible in order to secure the maximum leverage.

In addition to offsetting the buoyancy tank 8 or as an alternative to so doing, biassing means, such as weighted biassing chains, may be attached to the structure 5 for ensuring that it falls to the bed in the correct direction. Also, safety chains, such as the chains 21 (Figure 6) may be provided, attached to the structure and anchored to the bed, in order to prevent the structure falling against the side of the ship should a leak occur in the buoyancy tank or tanks when the structure is leaning towards the ship.

Instead of providing a buoyed air hose for emptying the buoyancy tank or tanks of water, an air line laid beside the pipe line 1 to the shore may be provided instead. This air line is connected to an air line on the structure 5 connected to the tank or tanks by means of a flexible air hose lying adjacent the flexible hoses 3.

Various other arrangements of the anchoring chains 15 may be made and the actual arrangement adopted in any particular installation may depend upon such factors as the strength of tidal currents and the degree of movement to be permitted for the upper end of the structure.

Although it is preferable for the submersible structure to be returned to its horizontal position on the bed after each loading or unloading operation, since this will facilitate mooring and casting off of the ship or other vessel and will reduce the likelihood of the structure being damaged in a storm etc., where local conditions permit the structure may be left permanently erected by means of its buoyancy tanks, means for evacuating the buoyancy tanks or allowing water to reenter them being dispensed with altogether.

In case of emergencies, when it may be desired to lower the structure to its normal horizontal position quickly, a quick release air valve may be associated with each buoyancy tank, which valve can be quickly and easily released, for instance, by means of a line made available at the free ends of the flexible hoses 10.

A ladder may be provided on the structure to facilitate inspection of the tank or tanks and the various pipe connections etc.

I claim:

1. Apparatus comprising an elongated rigid structure, means secured to the bed of a body of water, means pivotally connecting one end of said structure to said first mentioned means, at least one buoyancy chamber on said structure which when filled with air maintains the structure in an at least approximately vertical position with the other end of said structure above the surface, a fluid conduit extending longitudinally of said structure and flexibly connected at said secured end of the structure to a pipe line laid on the bed, and means at said other end of the structure for effecting a fluid connection between said conduit and a floating vessel.

2. An apparatus according to claim 1, in which means are provided for evacuating water from said buoyancy chamber, in order to raise the structure from a horizontal position on the bed to said approximately vertical position, and for allowing water to re-enter same in order to return the structure to a horizontal position on the bed.

3. An apparatus according to claim 2, in which said means for evacuating water from said buoyancy chamber, comprise an air hose, one end of which is buoyed at the surface for connection to a source of compressed air and the other end of which is connected to said buoyancy chamber, a vent being provided on said buoyancy chamber through which water can be made to leave or enter said buoyancy chamber.

4. An apparatus according to claim 2, in which said means for evacuating water from said buoyancy chamber, comprises an air line laid on the bed connecting a shore based source of compressed air to an air line provided on said structure and connected to said buoyancy chamber by means of a flexible air hose connecting said air lines, a vent being provided on said chamber through which water can be made to leave or enter said chamber.

5. An apparatus according to claim 2, in which the second mentioned means connects the structure to said first mentioned means to two spaced apart points on said one end of said structure, so that during the raising and lowering to a horizontal position on the bed by evacuating and flooding said buoyancy chamber, the structure is guided for pivotal movement substantially in one vertical plane about a horizontal axis passing through said two points, both said means permitting relative vertical movement between said two points on said structure so as to allow displacement of said structure from said vertical plane by external forces.

6. An apparatus according to claim 5, in which said structure is formed at said one end into two leg members with one of said two points being disposed at the end of each leg member, said first mentioned means comprising chains attached at one end to said two points while the other end of each chain is secured to the bed.

7. An apparatus according to claim 6, in which three securing chains are attached to each of the said two points on the structure and the other ends of the chains are secured to the bed at points disposed at three of the base angles of a regular square based pyramid whose apex is disposed at the point, the base of each pyramid being parallel to the bed with each of the fourth base angles being disposed towards each other and lying vertically beneath said horizontal axis.

8. An apparatus according to claim 2, in which said buoyancy chamber is disposed on said structure with its center of buoyancy displaced to one side of the longitudinal center line of said structure, whereby said buoyancy chamber when filled with air tends to hold said structure at an angle inclined to the vertical, the vertical plane through the pivotally connected end of the structure lying to the same side of said longitudinal center line as does the center of buoyancy.

9. An apparatus according to claim 8, in which said angle of inclination to the vertical is 20°.

10. An apparatus according to claim 2, in which there are a plurality of said buoyancy chambers on the structure some of which are permanently filled with air when the structure is in a horizontal position on the bed, but provide insufficient buoyancy to raise said structure.

11. An apparatus according to claim 10, in which an air line connects those buoyancy chambers permanently filled with air with those not evacuated of water in said horizontal position, and a value is included in said air line operable to allow air stored in said permanently filled chambers under pressure to flow through said air line into the remaining chambers and render them buoyant to raise the structure.

12. An apparatus according to claim 2, in which a quick release air valve is associated with said buoyancy chamber and means readily accessible at or above the surface are provided for operating said quick release air valve for enabling said structure to be lowered quickly to a horizontal position on the bed in cases of emergency.

13. An apparatus according claim 2, in which safety chains are provided, secured to said structure at one end and anchored to the bed at the other to prevent said structure falling in a wrong direction to the bed should a leak occur in said buoyancy chamber.

14. An apparatus according to claim 1, in which the means for effecting said fluid connection comprises a flexible hose connected to said conduit at one end and adapted for connection to said vessel at the other end.

15. An apparatus according to claim 1, in which said conduit forms the main support element of said structure.

16. An apparatus according to claim 1, in which said structure is comprised wholly of said conduit.

17. An apparatus according to claim 1 in which said conduit passes through said buoyancy chamber.

18. An apparatus according to claim 1, in which safety chains are provided, secured to said structure at one end and anchored to the bed at the other to prevent said structure falling in a wrong direction to the bed should a leak occur in said one or more buoyancy chambers.

19. An apparatus according to claim 1, in which lines are provided, secured at one end to the structure and the opposite end adapted to be attached to the ship to control the structure and to take any strain from the means for effecting a fluid connection between the conduit and the ship.

20. Apparatus for transferring fluid products between a floating vessel and a submarine pipe line comprising an elongated structure, flexible moorings securing two points on the structure spaced laterally apart at one end thereof to spaced points on the sea bed adjacent the submarine pipe line, a buoyancy chamber mounted on the structure intermediate the ends thereof with its center of buoyancy lying to one side of a plane passing through said two points on the structure and extending longitudinally of the structure, said chamber when filled with air rendering the structure buoyant and tending to hold the structure inclined upwardly from said one end at an acute angle to the vertical with the vertical plane which passes through said two points on the structure lying to the same side of said longitudinally extending plane as does said center of buoyancy and with said moorings held in tension, said structure being of such length that its other end then projects above the surface of the water, the filling of said chamber with water allowing the structure to sink to and rest on the sea bed, means operable when the structure is resting on the sea bed for forcing air into said chamber to displace water therefrom and render said structure buoyant, means operable to allow air to escape from and water to reenter said chamber, a fluid conduit extending longitudinally of said structure and flexibly connected at said moored end of the structure to the submarine pipe line, and a flexible hose connected to said conduit at said other end of said structure and adapted for connection to the floating vessel.

References Cited in the file of this patent

UNITED STATES PATENTS

| | | |
|---|---|---|
| 729,992 | Baker | June 2, 1903 |
| 1,840,324 | Lindquist | Jan. 12, 1932 |
| 2,648,201 | Marancik et al. | Aug. 11, 1953 |
| 2,731,168 | Watts | Jan. 7, 1956 |
| 2,748,739 | Monti et al. | June 5, 1956 |
| 2,783,027 | Gilbert | Feb. 26, 1957 |